United States Patent [19]

Henton

[11] Patent Number: 4,831,116

[45] Date of Patent: May 16, 1989

[54] PROCESS FOR COAGULATING A GRAFTED RUBBER COMPOUND

[75] Inventor: David E. Henton, Midland, Mich.

[73] Assignee: The Dow Chemical Company, Midland, Mich.

[21] Appl. No.: 86,005

[22] Filed: Aug. 17, 1987

[51] Int. Cl.[4] ............................................. C08J 3/16
[52] U.S. Cl. ................................... 528/492; 523/375; 528/502; 528/936
[58] Field of Search ................ 523/335; 528/492, 502, 528/936

[56] References Cited

U.S. PATENT DOCUMENTS

| | | | |
|---|---|---|---|
| 2,161,949 | 6/1939 | Calcott | 528/492 |
| 2,576,909 | 12/1951 | Adams | 523/335 |
| 3,583,967 | 6/1971 | Hattori et al. | 523/335 |
| 3,632,507 | 1/1972 | Witt | 528/492 |
| 4,042,564 | 8/1977 | Bennetti, Jr. et al. | 260/47 ET |
| 4,103,074 | 7/1978 | Hertel et al. | 528/936 |
| 4,284,737 | 8/1981 | Kruse et al. | 528/492 |
| 4,299,952 | 11/1981 | Pingel et al. | 528/500 |
| 4,319,020 | 3/1982 | Coseia et al. | 528/492 |
| 4,338,429 | 7/1982 | Serini et al. | 528/492 |
| 4,569,991 | 2/1986 | Fujino | 528/487 |
| 4,581,444 | 4/1986 | Fujino | |
| 4,668,738 | 5/1987 | Lee et al. | 523/335 |

Primary Examiner—Allan M. Lieberman

[57] ABSTRACT

Grafted rubber compounds are coagulated after emulsion polymerization through the combination of mechanical shear forces and a water soluble cationic surfactant.

10 Claims, No Drawings

PROCESS FOR COAGULATING A GRAFTED RUBBER COMPOUND

BACKGROUND OF THE INVENTION

The present invention relates to a process for coagulating and recovering a grafted rubber compound from an aqueous latex, and more particularly to a process which utilizes mechanical shear forces in combination with a water soluble cationic surfactant such as a quaternary ammonium salt to coagulate and recover a grafted rubber compound.

Synthetic resins are prepared in a variety of ways. For some synthetic resins, it is desirable to prepare the resin using emulsion polymerization techniques in order that a desired particle size, molecular weight, or grafting reaction may be obtained. In this art, the terms latex, aqueous emulsion, and microsuspension have all been variously used to identify such emulsion polymerization techniques.

Grafted rubber compounds are typically emulsion polymerized and then coagulated to separate the polymer resin from the water phase of the emulsion. Many techniques have been used in the past to coagulate the polymer and recover it. For example, it is known in the art to add metal salts such as magnesium or aluminum sulfate to facilitate coagulation. However, the addition of those metal salts is undesirable from a product quality standpoint. Kruse et al., U.S. Pat. No. 4,284,737, issued Aug. 18, 1981, teach the use of a cationic surfactant selected from the group of pyridinium salts, amine and quaternary ammonium salts, and imidazolinium salts.

Others have used mechanical shear forces to cause coagulation. For example, Pingel et al, U.S. Pat. No. 4,299,952, issued Nov. 10, 1981, teaches shear coagulation of latexes in the presence of steam followed by recovery of the resin solids. However, this technique is limited to only certain types of latexes which are suitable for coagulation. Typically, latexes used in emulsion polymerization processes are stabilized against coagulation by the use of anionic soaps or surfactants during polymerization. Such stabilized latexes are difficult or impossible to destabilize and coagulate by the use of shear forces.

It would be desirable to have a latex with high shear stability during polymerization but low shear stability during coagulation and recovery. Such a process would permit the polymerization process to run with greater flexibility and have less precoagulation problems and reactor fouling. Yet, during the recovery portion of the process, the latex could be readily destabilized and the resin solids could be readily isolated. Accordingly, the need still exists in this art for a process which is flexible during the emulsion polymerization portion of the process and yet permits ready coagulation and recovery of grafted resin solids from the latex.

SUMMARY OF THE INVENTION

The present invention meets that need by providing a process for coagulating and recovering a grafted rubber compound from an aqueous latex which includes the steps of dispersing a water soluble cationic surfactant containing a quaternary ammonium or other cationic salt into the latex and then subjecting the latex to mechanical shear forces for a time sufficient to cause the latex to coagulate. The grafted rubber compound may then be readily recovered by isolating it from the water phase.

The process of the present invention is operable with synthetic resinous thermoplastic latexes having solids contents of from about 2 to about 75%, and preferably from about 10 to about 50%, by weight. Typical latexes operable in the practice of the present invention include grafted rubber compounds such as styrene-acrylonitrile-rubber latexes wherein a styrene-acrylonitrile copolymer(SAN) is grafted to a diene rubber substrate such as polybutadiene to form ABS polyblends.

The use of a combination of mechanical shear forces with a cationic surfactant containing a quaternary ammonium or other cationic compound in the present invention provides a flexible, efficient, and lower energy consumption process. Surprisingly, this combination is effective to cause coagulation even in those latexes which have been stabilized against coagulation through the use of anionic soaps or surfactants. For example, the above-mentioned Kruse et al, U.S. Pat. No. 4,284,737, teaches the need for the addition of from 60 to 100% molar equivalent of a cationic surfactant such as an imidazolinium, pyridinium, or quaternary ammonium salt to achieve coagulation of an aqueous latex. The process of the present invention is effective to cause coagulation at much lower levels of cationic surfactant, with from about 1 to about 50%, and preferably from about 10 to about 25% molar equivalent being required to effect coagulation.

Accordingly, it is an object of the present invention to provide an efficient and flexible process for coagulating and recovering grafted rubber compounds from aqueous latexes. This, and other objects and advantages of the invention will become apparent from the following detailed description and the appended claims.

DESCRIPTION OF THE PREFERRED EMBODIMENTS

The process of the present invention may be carried out utilizing conventional equipment. For example, the polymerization may be carried out in an emulsion polymerization reactor where the aqueous and oil phases are intimately mixed. Coagulation of the grafted rubber containing latex may be accomplished in a shear coagulator of the type described in Pingel et al., U.S. Pat. No. 4,299,952. The shear coagulation is preferably carried out between ambient temperature and 100° C. although there is no need to add steam to the process as was necessary in previous shear coagulation procedures.

Typically, the latex may be stabilized during the polymerization stage of the process through the use of anionic surfactants. Such anionic surfactants can be selected from the group of alkali and alkaline earth salts of fatty acids such as oleates, palmitates, stearates, abietates, and mixtures thereof. Also, alkyl and alkaryl sulfonates, sulfosuccinates, sulfated or sulfonated esters and ethers, sulfated or sulfonated amines and amides may be utilized. Any anionic surfactant can be used that has water solubility and a surface activity sufficient to emulsify the reaction mixture.

The latex used in the practice of the present invention may have from about 2 to about 75%, and preferably from about 10 to about 50%, by weight solids. While it is believed that the process is operable with a variety of synthetic resinous thermoplastic latexes such as polystyrene latex, polymethyl methacrylate latex, polybutadiene polyisoprene latex, styrene butadiene latex, and the like, latexes which are particularly suitable for use in the present invention are grafted rubber latexes which are most advantageously produced using emulsion polymerization techniques. For example, styrene-acrylonitrile-rubber latexes wherein a styrene-acrylonitrile copolymer is grafted to a diene rubber substrate such as polybutadiene to form an ABS polyblend are particularly suitable.

After emulsion polymerization, the latex emulsion is passed to a shear coagulator where a water soluble cationic surfactant containing a quaternary ammonium or other cationic salt is added. Quaternary ammonium salts are well known and include alkyl and aryl ammonium halides and acetates. Cationic surfactants believed to be useful in the practice of the present invention include positively charged nitrogen containing compounds having at least one hydrophobic R group, usually derived from either fatty acids or petrochemical sources. The R group may be attached directly to the nitrogen as in the case of stearyl trimethyl ammonium chloride, or indirectly as in the case of diisobutyl phenoxyethoxy ethyl dimethylbenzyl ammonium chloride. The nitrogen atom can also be a part of a heterocyclic ring as in the case of alkyl pyridinium salts or alkyl imidazolinium salts. An example of such a heterocyclic cationic surfactant is the substituted imidazolinium salt available from Scher Chemicals, Inc. under the designation Schercoquat IIB(trademark).

The combination of the shearing forces generated by the shear coagulator and the addition of the cationic surfactant cause the latex to coagulate. Even where the latex has previously been stabilized against coagulation by the use of anionic soaps, the process of the present invention is effective. While the use of a stoichiometric equivalent amount of a cationic surfactant such as a quaternary ammonium salt may be used to neutralize the anionic soap, it has been found that the process is effective to cause coagulation at much lower levels of cationic surfactant. From about 1 to about 50%, and preferably from about 10 to about 25%, molar equivalent of cationic surfactant has been found to be effective in combination with the shear forces generated by the shear coagulator.

Additionally, it has been found that the process of the present invention is effective on neutral to somewhat basic latexes, i.e., those latexes having a pH of between about 7.0 to about 10.0. Although the process will be operable on latexes with an acidic pH, no acid need be added to the latex to destabilize it prior to the addition of the cationic surfactant.

In order that the invention may be more readily understood, reference is made to the following examples, which are intended to illustrate the invention, but are not to be taken as limiting the scope thereof.

Example 1

A grafted rubber ABS latex containing 35% solids including 2.73% by weight anionic soap (sodium dodecylbenzene sulfonate) based on the solids was used. This latex was shear coagulated using a commercial 1000 ml WARING ® blender to determine the time required to coagulate the latex. The coagulation was evident by appearance, the sound of the blender motor, as well as a drop in amperage from an inline amp meter. Long coagulation times indicate high shear stability and require significant amounts of energy to isolate the polymer from the water phase. 200 g of latex (pH=8.2) was used in each run, and varying amounts of cationic surfactant containing a quaternary ammonium salt were added to complex the anionic soap. The improved coagulation process is evident from the shorter coagulation times reported in Table I below. A 5% solution of a dimethyldialkyl ammonium chloride (DMDAAC) was added as the cationic surfactant.

TABLE I

| Run Number | ml of 5% DMDAAC Added | % Molar Equivalence of Anionic Soap | Time to Coagulate |
|---|---|---|---|
| 1 | 0 | 0 | 372 sec |
| 2 | 4.3 | 25 | 146 sec |
| 3 | 8.6 | 50 | 20 sec |
| 4 | 12.9 | 75 | 4 sec |

Example 2

A grafted rubber ABS latex having 47.3% solids, a pH of 8.2, and containing 2.41% of sodium dodecylbenzene sulfonate anionic soap by weight was used. Time to coagulate was again measured utilizing the equipment and procedure of Example 1. A 10% aqueous solution of Schercoquat IIB, a cationic substituted imidazolinium salt commercially available from Scher Chemicals, Inc. was added in varying amounts. The results are reported in Table II below.

TABLE II

| Run Number | ml of 10% Schercoquat IIB | % Molar Equivalence of Anionic Soap | Time to Coagulate |
|---|---|---|---|
| 5 | 0 | 0 | 335 sec |
| 6 | 3.3 | 10 | 60 sec |
| 7 | 8.3 | 25 | 10 sec |

Example 3

A grafted rubber ABS latex having 15.0% solids, a pH of 8.0, and containing 2.41% of sodium dodecylbenzene sulfonate anionic soap by weight was used. Time to coagulate was again measured utilizing the equipment and procedure of Example 1. A 10% solution of Schercoquat IIB was added in varying amounts. The results are reported in Table III below.

TABLE III

| Run Number | ml of 10% Schercoquat IIB | % Molar Equivalence of Anionic Soap | Time to Coagulate |
|---|---|---|---|
| 8 | 0 | 0 | 576 sec |
| 9 | 2.6 | 25 | 151 sec |
| 10 | 7.9 | 75 | 5 sec |

Example 4

A grafted rubber ABS latex having 42.6% solids, a pH of 8.2, and containing 2.41% of sodium dodecylbenzene sulfonate and 2.0% sodium oleate anionic soap by weight was used. Time to coagulate was again measured utilizing the equipment and procedure of Example 1. A 10% solution of Schercoquat IIB was added in varying amounts. The results are reported in Table IV below.

TABLE IV

| Run Number | ml of 10% Schercoquat IIB | % Molar Equivalence of Anionic Soap | Time to Coagulate |
|---|---|---|---|
| 11 | 0 | 0 | 509 sec |
| 12 | 5.8 | 10 | 16 sec |
| 13 | 14.5 | 25 | 5 sec |

The above experimental runs demonstrate the surprising effects of the combination of shear forces with the cationic salts on coagulation times of grafted rubber latexes. Runs 5, 8, and 11 above show typical coagulation times for anionic soap stabilized latexes when using shear forces alone. The addition of even small amounts (i.e., 10% molar equivalent) of cationic salts results in dramatic decreases in coagulation times.

Run 12 further demonstrates this surprising effect. There, a total of 4.41% by weight anionic soap was only 10% neutralized with the substituted imidazolinium salt. Without the application of shear forces, such a low level of cationic surfactant would still leave an anionic soap stabilized latex which does not coagulate even after days of sitting. It would be expected that the Run 12, still having approximately 4.0% anionic soap (4.41%−0.1 (4.41)), would have greater stability than either of the latexes of Runs 5 or 8 (2.41% soap). Without the surprising effects of the combination of shear forces with the cationic surfactants, Run 12 would be expected to have a coagulation time greater than Runs 5 and 8.

Example 5

A grafted rubber ABS latex having 15.0% solids, a pH of 4.0, and containing 2.41% sodium dodecylbenzene sulfonate by weight was used. Time to coagulate was again measured utilizing the equipment and procedure of Example 1. A 10% HSO-4 quaternary ammonium salt solution was prepared by mixing 10.0 g of a diamine, JET-Amine D-T from Jetco Chemicals, with 3.0 g of sulfuric acid and 87.0 g of water. This 10% solution was added in varying amounts to the latex. The results are reported in Table V below.

TABLE V

| Run Number | ml of 10% Quat Salt Solution | Time to Coagulate |
| --- | --- | --- |
| 14 | 0 | 478 sec |
| 15 | 2.6 | 61 sec |
| 16 | 7.9 | 3 sec |

Having described the invention in detail and by reference to preferred embodiments thereof, it will be apparent that modifications and variations are possible without departing from the scope of the invention defined in the appended claims.

What is claimed is:

1. A process for coagulating and recovering a grafted rubber compound from an aqueous latex containing said grafted rubber compound which has been stabilized by the addition of an anionic surfactant or soap, comprising the steps of dispersing a water soluble cationic surfactant which is present in an amount of from about 1 to about 50% molar equivalent weight of said anionic surfactant or soap into said latex at a pH of 7.0 or above and subjecting said latex to mechanical shear forces for a time sufficient to cause said latex to coagulate, and recovering said grafted rubber compound.

2. The process of claim 1 in which said latex has from about 10 to about 50% solids by weight.

3. The process of claim 1 in which said cationic surfactant is a quaternary ammonium salt.

4. The process of claim 3 in which said quaternary ammonium salt is present in an amount of between about 10 to about 25% molar equivalent weight of said anionic soap or surfactant.

5. The process of claim 3 in which said quaternary ammonium salt is dimethyldialkyl ammonium chloride.

6. The process of claim 3 in which said quaternary ammonium salt is the reaction product of a diamine and sulfuric acid.

7. The process of claim 1 in which said cationic surfactant is a substituted imidazolinium salt.

8. The process of claim 1 in which said step of subjecting said latex to mechanical shear forces is carried out at ambient temperature.

9. A process for coagulating and recovering a grafted rubber compound from an aqueous latex containing said grafted rubber compound which has been stabilized by the addition of an anionic surfactant or soap, comprising the steps of dispersing a water soluble cationic surfactant into said latex at a pH of 7.0 or above and subjecting said latex to mechanical shear forces at ambient temperature for a time sufficient to cause said latex to coagulate, and recovering said grafted rubber compound.

10. The process of claim 9 in which said cationic surfactant is a quaternary ammonium salt, which salt is present in an amount of between about 1 to about 50% molar equivalent weight of said anionic soap or surfactant.

* * * * *